United States Patent
Dennison et al.

(10) Patent No.: US 11,170,263 B2
(45) Date of Patent: Nov. 9, 2021

(54) DISTRIBUTED BATCH NORMALIZATION USING ESTIMATES AND ROLLBACK

(71) Applicant: NVIDIA Corporation, Santa Clara, CA (US)

(72) Inventors: Larry Robert Dennison, Mendon, MA (US); Benjamin Klenk, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 278 days.

(21) Appl. No.: 16/669,979

(22) Filed: Oct. 31, 2019

(65) Prior Publication Data

US 2020/0160123 A1  May 21, 2020

Related U.S. Application Data

(60) Provisional application No. 62/767,978, filed on Nov. 15, 2018, provisional application No. 62/768,298, filed on Nov. 16, 2018.

(51) Int. Cl.
*G06K 9/62* (2006.01)
*G06N 3/08* (2006.01)
(Continued)

(52) U.S. Cl.
CPC ........... *G06K 9/6257* (2013.01); *G06F 7/483* (2013.01); *G06F 9/3885* (2013.01);
(Continued)

(58) Field of Classification Search
CPC .. G06K 9/6257; G06K 9/6265; G06K 9/6298; G06F 7/483; G06F 9/3885; G06N 3/0481; G06N 3/08
See application file for complete search history.

(56) References Cited

U.S. PATENT DOCUMENTS

| 10,423,861 B2 * | 9/2019 | Gao ..................... G06N 3/0481 |
| 2020/0090045 A1 * | 3/2020 | Baker ................... G06N 3/006 |

(Continued)

OTHER PUBLICATIONS

K. He, et al., "Deep residual learning for image recognition," in Proceedings of the IEEE conference on computer vision and pattern recognition, pp. 770-778, 2016.

(Continued)

*Primary Examiner* — Qun Shen
(74) *Attorney, Agent, or Firm* — Leydig, Voit & Mayer, Ltd.

(57) ABSTRACT

A technique utilizing speculative execution and rollback for performing data parallel training of a neural network model is disclosed. Activations for a layer of the neural network model are normalized during a speculative normalization operation using estimated normalization parameters associated with a partial population of a set of training data allocated to a particular processor. Normalization parameters associated with the total population of the set of training data are generated by a distributed reduce operation in parallel with the speculative normalization operation. An optional rollback operation can revert the activations to a pre-normalization state if the estimated normalization parameters for the partial population are subsequently determined to be inaccurate compared to the normalization parameters for the population of the set of training data distributed across a plurality of processors.

25 Claims, 13 Drawing Sheets

(51) Int. Cl.
  *G06F 7/483* (2006.01)
  *G06F 9/38* (2018.01)
  *G06N 3/04* (2006.01)
(52) U.S. Cl.
  CPC ......... *G06K 9/6265* (2013.01); *G06K 9/6298* (2013.01); *G06N 3/0481* (2013.01); *G06N 3/08* (2013.01)

(56) References Cited

U.S. PATENT DOCUMENTS

2020/0143255 A1* 5/2020 Daniel ................ G06N 3/0635
2020/0193296 A1* 6/2020 Dixit ........................ G06K 9/62

OTHER PUBLICATIONS

S. Ioff, et al., "Batch normalization: Accelerating deep network training by reducing internal covariate shift," in Proceedings of the $32^{nd}$ International Conference on Machine Learning (F. Bach and D. Blei, eds.), vol. 37 of Proceedings of Machine Learning Research, (Lille, France), pp. 448-456, PMLR, Jul. 7-9, 2015.
Y. Wu, et al., "Group normalization," arXiv preprint arXiv:1803. 08494, 2018.
S. Ioffe, "Batch renormalization: Towards reducing minibatch dependence in batch-normalized models," in Advances in Neural Information Processing Systems, pp. 1945-1953, 2017.

\* cited by examiner

DISTRIBUTED BATCH NORMALIZATION USING ESTIMATES AND ROLLBACK

CLAIM OF PRIORITY

This application claims the benefit of U.S. Provisional Application No. 62/767,978 titled "Distributed Batch Normalization," filed Nov. 15, 2018, and U.S. Provisional Application No. 62/768,298 titled "Distributed Batch Normalization," filed Nov. 16, 2018, the entire contents of which are incorporated herein by reference.

STATEMENT REGARDING FEDERALLY SPONSORED RESEARCH AND DEVELOPMENT

This invention was made with US Government support under Agreement H98230-16-3-0001 awarded by DoD. The US Government has certain rights in this invention.

TECHNICAL FIELD

The present disclosure relates to techniques for training a neural network. More particularly, the present disclosure relates to techniques for performing batch normalization while training the neural network on a distributed system.

BACKGROUND

Deep learning neural networks are adapted for a large variety of tasks. Many of these networks are implemented to utilize supervised training to configure the weights and biases associated with the layers of the neural network. The training set can include corresponding pairs of input samples and target output samples. In some embodiments, input samples can be images and target output samples are images that represent the processed target output of the neural network. In other embodiments, the input samples can be images and target output samples are a classification of the images. The input samples are processed by the neural network to produce an output sample, which is compared to the target output sample by a loss function. The result of the loss function is back-propagated through the neural network model to adjust the weights and/or biases associated with each neuron in the neural network model.

In some embodiments, the neural network model is designed to normalize activations between the layers of the neural network. As used throughout the following description, the input to a layer of the neural network model is referred to as a feature vector, which is a vector of scalar values associated with the input to the neurons of the layer. Each neuron calculates a weighted sum of one or more values from the feature vector and, optionally, adds the intermediate result to a bias value. The output of the neuron is then passed to an activation function. The activation function maps the output to a particular range, as specified by the particular activation function selected. The set of activations (i.e., the values output by the activation functions for the set of neurons in the layer) can then be normalized using a set of normalization parameters. The normalization parameters can scale and/or shift the set of activations based on statistical measures (e.g., mean/variance, etc.) for the batch of training samples before the normalized set of activation is passed to the next layer of the neural network model. Various embodiments of the neural network model can vary the order of the function, activations and normalization in each layer.

One method to speed up training is to divide the training set into different batches and process a portion of each batch, in parallel, by different instances of the neural network implemented on multiple processors distributed over a network. However, when training according to this data parallel training technique, the normalization parameters utilized between each layer of the neural network are typically still calculated based on the statistical measures for the batch of training samples as generated by the multiple, distributed processors. Therefore, there is a synchronization issue where each of the processors stalls after each layer of the neural network in order to wait for a response from a separate processor configured to calculate the normalization parameters for the layer. Once the normalization parameters have been received by each of the processors, the next layer of the neural network can be executed using the normalized activations as input. This synchronization issue can significantly slow down the time required to train the neural network. Thus, there is a need for addressing these issues and/or other issues associated with the prior art.

SUMMARY

A method, computer readable medium, and system are disclosed for implementing a technique for performing data parallel training of a neural network model. Activations for a layer of the neural network model are normalized during a speculative normalization operation using estimated normalization parameters associated with a partial population of a set of training data allocated to a particular processor. Normalization parameters associated with the total population of the set of training data are generated by a distributed reduce operation in parallel with the speculative normalization operation. An optional rollback operation can revert the activations to a pre-normalization state if the estimated normalization parameters for the partial population are subsequently determined to be inaccurate compared to the normalization parameters for the population of the set of training data distributed across a plurality of processors.

In one embodiment, a method for training a neural network model includes the steps of processing a set of training samples allocated to the processor by a layer of the neural network model to generate activations, analyzing the activations to calculate a statistical measure associated with the activations for the at least one sample, and generating estimated normalization parameters based on the statistical measure. The estimated normalization parameters are applied, in a speculative normalization operation, to at least a portion of the activations to generate normalized activations. In parallel with the speculative normalization operation, the statistical measure is transmitted to at least one additional processor connected to the plurality of processors, the at least one additional processor configured to reduce multiple statistical measures received from the plurality of processors to generate normalization parameters. The method further includes the steps of receiving the normalization parameters from the at least one additional processor and reverting the speculative normalization operation to a pre-normalization state when the estimated normalization parameters are outside of an acceptable range of the normalization parameters received from the at least one additional processor.

In one embodiment, the statistical measure associated with the activations is calculated based on an analysis of activations for all training samples in the set of training samples allocated to the processor.

In one embodiment, reverting the speculative normalization operation to a pre-normalization state includes invalidating the normalized activations stored in a memory. In some embodiments, reverting the speculative normalization operation to a pre-normalization state further includes invalidating at least one operation associated with a subsequent layer of the neural network model configured to process the normalized activations generated during the speculative normalization operation.

In one embodiment, the steps of the method further include applying, in a second normalization operation, the normalization parameters to the activations to generate normalized activations and providing the normalized activations as a feature vector to a particular processor in the plurality of processors configured to implement a subsequent layer of the neural network model.

In one embodiment, the estimated normalization parameters are outside of the acceptable range of the normalization parameters when a difference between the estimated normalization parameters and the normalization parameters is greater than a threshold value. In some embodiments, the threshold value is based on a variance included in the normalization parameters.

In one embodiment, analyzing the activations includes calculating at least one of a mean value or a variance for the activations. In one embodiment, the estimated normalization parameters and the normalization parameters include a mean value and a variance for each channel of the activations In one embodiment, reverting the speculative normalization operation to a pre-normalization state comprises re-normalizing a subset of the channels of the activations based on a binary mask that identifies whether each channel of the activations corresponds with accurate or inaccurate estimated normalization parameters.

In one embodiment, a system for training a neural network model is disclosed. The system includes a processor and at least one additional processor in communication with the processor. The processor is configured to process a set of training samples allocated to the processor by a layer of the neural network model to generate activations, analyze the activations to calculate a statistical measure associated with the activations for the at least one sample, generate estimated normalization parameters based on the statistical measure, apply, in a speculative normalization operation, the estimated normalization parameters to at least a portion of the activations to generate normalized activations, and revert the speculative normalization operation to a pre-normalization state when the estimated normalization parameters are outside of an acceptable range of normalization parameters received via a network. The at least one additional processor is configured to receive multiple statistical measures from a plurality of processors, reduce the multiple statistical measures received from the plurality of processors to generate normalization parameters associated with the layer of the neural network model, and transmit the normalization parameters to each of the processors in the plurality of processors via the network. The speculative normalization operation is performed in parallel with the at least one additional processor generating the normalization parameters In one embodiment, reverting the speculative normalization operation to a pre-normalization state comprises invalidating the normalized activations stored in a local memory for the processor.

In one embodiment, a non-transitory computer-readable media storing computer instructions for training a neural network model is disclosed. The instructions, when executed by one or more processors, cause the one or more processors to perform the steps of: processing a set of training samples allocated to the processor by a layer of the neural network model to generate activations, analyzing the activations to calculate a statistical measure associated with the activations for the at least one sample, generating estimated normalization parameters based on the statistical measure, applying, in a speculative normalization operation, the estimated normalization parameters to at least a portion of the activations to generate normalized activations, transmitting the statistical measure to at least one additional processor connected to the plurality of processors, the at least one additional processor configured to reduce multiple statistical measures received from a plurality of processors to generate normalization parameters, receiving the normalization parameters from the at least one additional processor, and reverting the speculative normalization operation to a pre-normalization state when the estimated normalization parameters are outside of an acceptable range of the normalization parameters received from the at least one additional processor.

DETAILED DESCRIPTION

The following Figures describe an approach for performing distributed batch normalization using speculative execution and rollback. More specifically, a data parallel training technique can be utilized to train a neural network where the normalization parameters are estimated based on the activations for the training samples allocated to each processor. The execution of a speculative normalization operation can proceed at the processor while normalization parameters across a population of training samples distributed across a plurality of processors are calculated by an additional processor. The normalization parameters are transmitted back to each of the processors and the speculative normalization operation can be rolled back as needed when the estimated normalization parameters based on the partial population are inaccurate when compared to the subsequent received normalization parameters based on the total population.

The methods and systems described below include a neural network that processes a feature vector to generate an output. The neural network is implemented on a distributed system that includes a number of processors working in parallel. Each processor implements an instance of the neural network configured to process a portion of a training set. The processors can be connected via a network to transfer data between memories associated with each processor.

As used herein, all input sample/target output sample pairs (i.e., a training sample) in the training set can be referred to as a batch. A sub-set of the training samples is referred to as a mini-batch, which is equivalent to a portion of the training set. Each mini-batch is processed, during a training iteration, by the neural network to generate outputs that are compared to the corresponding target output samples by a loss function that is used to update the weights and biases of the neural network. Multiple training iterations can be used to update the weights and biases with different mini-batches from the batch. In data parallel training, each mini-batch can be further divided into sub-batches, where each sub-batch can be processed by a different instance of the neural network executed by a processor thereby increasing the training speed using parallelism.

Figure 1:
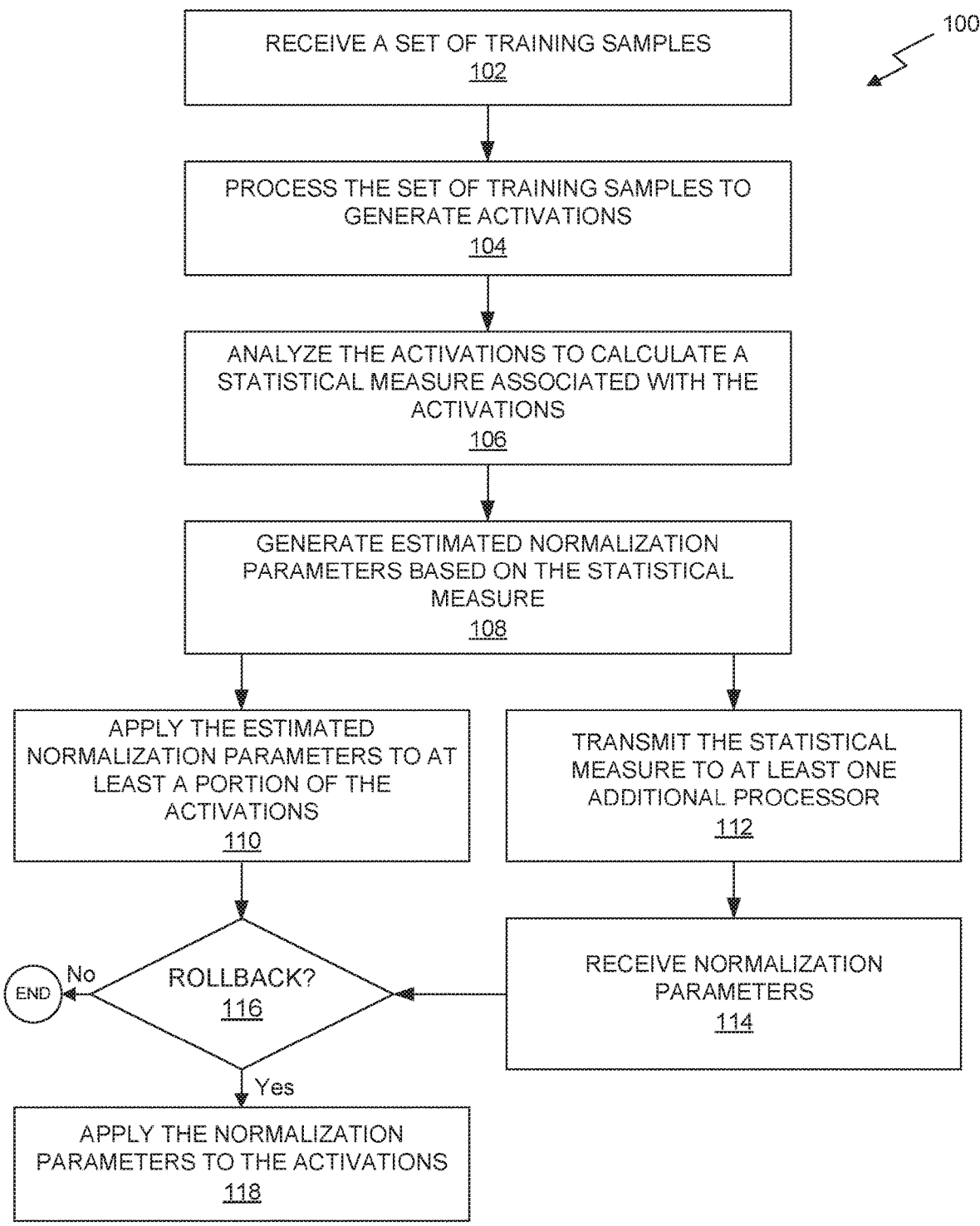
FIG. 1 illustrates a flowchart of a method for training a neural network model, in accordance with an embodiment.

FIG. 1 illustrates a flowchart of a method 100 for training a neural network model, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of implementing a deep learning neural network, as described in more detail below. Furthermore, persons of ordinary skill in the art will understand that any system that performs method 100 is within the scope and spirit of embodiments of the present disclosure.

At step 102, a set of training samples included in a batch of training samples is received by a processor. In one embodiment, the processor is one of a plurality of processors. A mini-batch of training samples, selected from the batch, is divided into a plurality of sub-batches. Each sub-batch in the plurality of sub-batches refers to a portion of the training samples in the mini-batch of training samples allocated to a corresponding processor in the plurality of processors configured to train the neural network model in parallel.

At step 104, the set of training samples allocated to the processor is processed to generate activations. The set of training samples can be processed by a particular layer of the neural network model implemented by the processor.

At step 106, the activations produced by a particular layer of the neural network are analyzed by the processor to calculate statistical measures associated with the activations. In one embodiment, the statistical measures includes a mean value of the activations. In another embodiment, the statistical measure includes a variance of the activations. In yet other embodiments, the statistical measures includes both a mean value and a variance of the activations. In still other embodiments, the statistical measures can comprise other statistical values calculated based on the whole or a sub-set of the activations in each sample in the set of training samples.

At step 108, estimated normalization parameters are generated based on the statistical measures. In one embodiment, the estimated normalization parameters comprise a mean value and variance for each channel of the outputs for the sub-batch of training samples. It will be appreciated that the estimated normalization parameters are only an approximation of the mean value and variance for each channel of the outputs for the total population of samples in the mini-batch, and the accuracy of the estimated normalization parameters depends on how well the sub-batch represents the total population of the mini-batch.

At step 110, the estimated normalization parameters are applied to at least a portion of the activations in a speculative normalization operation. In one embodiment, the processor immediately proceeds to start normalizing activations using the estimated normalization parameters under the assumption that the estimated normalization parameters are accurate.

In parallel with step 110, at step 112, the statistical measures are transmitted to at least one additional processor to compute normalization parameters based on the total population of training samples included in the mini-batch. In one embodiment, the at least one additional processor is configured to reduce multiple statistical measures received from the plurality of processors to generate normalization parameters for the layer of the neural network. In one embodiment, the at least one additional processor can be omitted and one of the plurality of processors that implement an instance of the neural network model can perform the reduce operation to produce the normalization parameters.

In some embodiments, step 112 can be modified such that, any time after step 104, the activations are transmitted to the at least one additional processor and the at least one additional processor is configured to analyze the activations to generate the statistical measures associated with a particular sub-batch, subsequently reducing multiple statistical measures into normalization parameters associated with the mini-batch.

At step 114, the normalization parameters are received by the processor. In one embodiment, the at least one additional processor calculates the normalization parameters via a distributed reduce operation. Once the normalization parameters are calculated, indicating statistical measures from each of the plurality of processors were received and incorporated into the reduce operation, the normalization parameters are transmitted to each of the processors in the plurality of processors.

At step 116, a determination on whether to revert the speculative normalization operation is performed by the processor. In one embodiment, the processor compares the estimated normalization parameters with the normalization parameters to determine whether the estimated normalization parameters are outside of an acceptable range of the normalization parameters received from the at least one additional processor. In some embodiments, a difference between a mean value for the estimated normalization parameters and a mean value for the normalization parameters can be determined, and an absolute value of the difference can be compared to a threshold value to determine whether the estimated normalization parameters are outside of an acceptable range. In one embodiment, the threshold value can be calculated based on a variance included in the normalization parameters.

If the estimated normalization parameters are acceptable, then the speculative normalization operation can be allowed to complete, if necessary, using the estimated normalization parameters, thereby generating normalized activation for the particular layer. Once the normalized activations have been generated, the method 100 terminates.

However, if the estimated normalization parameters are not acceptable, then the speculative normalization operation is reverted to a pre-normalization state using a rollback operation. In one embodiment, the rollback operation includes invalidating the normalized activations in a memory. In another embodiment, the rollback operation includes overwriting the normalized activations with the activations prior to the speculative normalization operation, from a different location in memory.

In yet another embodiment, reverting the speculative normalization operation to a pre-normalization state includes invalidating at least one operation associated with a subsequent layer of the neural network model configured to process the normalized activations generated during the speculative normalization operation. In some cases, the speculative normalization operation can finish generating the normalized activations prior to the normalization operations being received from the at least one additional processor. In such cases, the speculative normalization operation can permit the normalized activations to be passed to the next layer of the neural network model for processing, continuing to track the subsequent operations to require rollback, if needed at a later point in time when the normalization parameters for the previous layer of the neural network model are finally received from the at least one additional processor.

At step 118, the normalization parameters received from the at least one additional processor are applied to the activations to generate normalized activations. In one embodiment, steps 104 through 118 can be repeated for each layer of the neural network model, processing the normalized activations from one layer by a subsequent layer of the neural network model to produce new activations. The new activations are normalized by additional normalization parameters for the corresponding layer.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
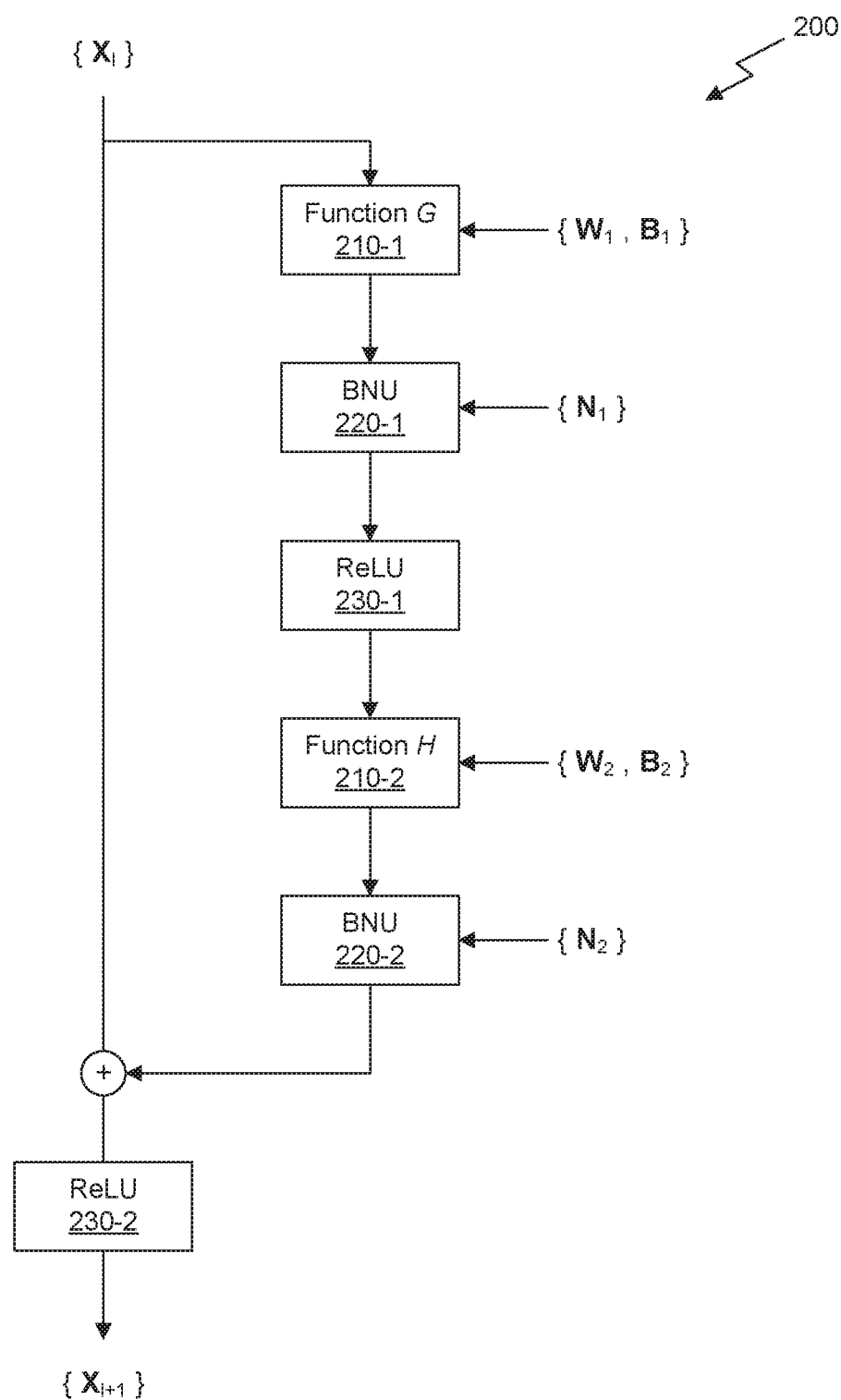
FIG. 2 is a conceptual illustration of a block of a neural network model, in accordance with some embodiments.

FIG. 2 is a conceptual illustration of a block 200 of a neural network model, in accordance with some embodiments. As depicted in FIG. 2, the block 200 of the neural network model includes two layers 210 that, in combination, implement a function F that operates on an input X to generate an output F(X). The block 200 of the neural network model depicted in FIG. 2 is a portion of a residual network that includes feed-forward links to combine the output of the one or more layers 210 in the block 200 with the input to the block 200. As used herein, the function F generally refers to any function that calculates one or more values of an output based on the values of the input. In one embodiment, the function F refers to a convolution operation that accepts an input comprising a feature vector and generates one or more feature maps based on one or more kernels. It will be appreciated that the function F can be the combination of a first function G, applied by a first layer 210-1, and a second function H, applied by a second layer 210-2.

In one embodiment, the input to the block 200, $X_i$, is passed to the first layer 210-1 of the block 200, which applies a convolution operation to the input based on the attributes for the first layer 210-1. The attributes can refer to weights, {W}, and/or biases, {B}, that are utilized by the first layer 210-1 to calculate the elements of the output. For example, the weights can refer to a set of coefficients of one or more convolution kernels utilized to produce a set of corresponding feature maps, and the biases can refer to a bias value that is added to each element of a corresponding feature map produced by the convolution operation.

In one embodiment, the neural network model implements batch normalization. As depicted in FIG. 2, each layer 210 is followed by a batch normalization unit (BNU) 220 that scales and/or shifts the elements of the feature maps output by the layer 210. The BNU 220 receives a set of normalization parameters, {N}, that are utilized to normalize the elements of the feature maps. The normalization parameters can be determined based on statistical measures (e.g., mean, variance, etc.) of a batch of training samples. The BNU 220 receives the feature maps produced by a layer 210 and generates normalized feature maps. In one embodiment, the normalized feature maps are passed to a rectified linear unit (ReLU) 230, which applies an activation function to each element of the normalized feature maps.

In some embodiments, the order of the BNU 220 and the ReLU 230 can be reversed such that the activation function is applied to the feature maps generated by the layer 210 followed by a normalization operation applied by the BNU 220 based on the normalization parameters. In yet other embodiments, the BNU 220 can be implemented in front of the layer 210 such that the inputs to the function are normalized prior to processing by the function. In still other embodiments, one or both of the BNU 220 and ReLU 230 can be omitted for certain layers 210. In other words, not every layer 210 of the block 200 needs to include batch normalization and/or an activation function in the flow of the data.

As depicted in FIG. 2, the input $X_i$ is processed, in sequence, by the first layer 210-1, first BNU 220-1, first ReLU 230-1, second layer 210-2, and second BNU 220-2 to produce an output F(X) that is then added to the input $X_i$ to generate the intermediate output $F(X)+X_i$. The intermediate output is then passed through the second ReLU 230-2 to produce a set of activations included in the output $X_{i+1}$. In some embodiments, the second ReLU 230-2 is placed after the second BNU 220-2 prior to adding the output F(X) to the original input, $X_i$.

The block 200 can be included in a much larger neural network that includes a series of blocks that are executed in sequence to process the input to the neural network. For example, common implementations of a ResNet include 37 or 50 blocks similar to block 200. Each block 200 can be different, depending on the implementation of the neural network, processing inputs of varying dimensions (e.g., having different dimensions in height, width, and/or number of channels), producing outputs of varying dimensions, or implementing different sized convolution operations, for example.

Training of the neural network involves adjusting the attributes (e.g., weights and/or biases) of each layer 210 of the neural network based on a loss function. The loss function compares the output of the neural network with a ground truth target included in the training set. A data parallel training technique is discussed in more detail below that can help speed up the time to train the neural network.

Each block 200, or portion of the block such as a layer 210 or a BNU 220, is described in the context of processing units that are configured to implement the block 200. One or more instances of the neural network model or portions thereof may be implemented as a program, custom circuitry, or by a combination of custom circuitry and a program. For example, the neural networks may be implemented by a GPU (graphics processing unit), CPU (central processing unit), or any processor capable of implementing layers of a neural network model. Furthermore, persons of ordinary skill in the art will understand that any system that performs the operations of the neural network model is within the scope and spirit of embodiments of the present disclosure. One such example of a parallel processing unit for implementing one or more of the components of the block 200 is described in more detail below.

Parallel Processing Architecture

Figure 3:
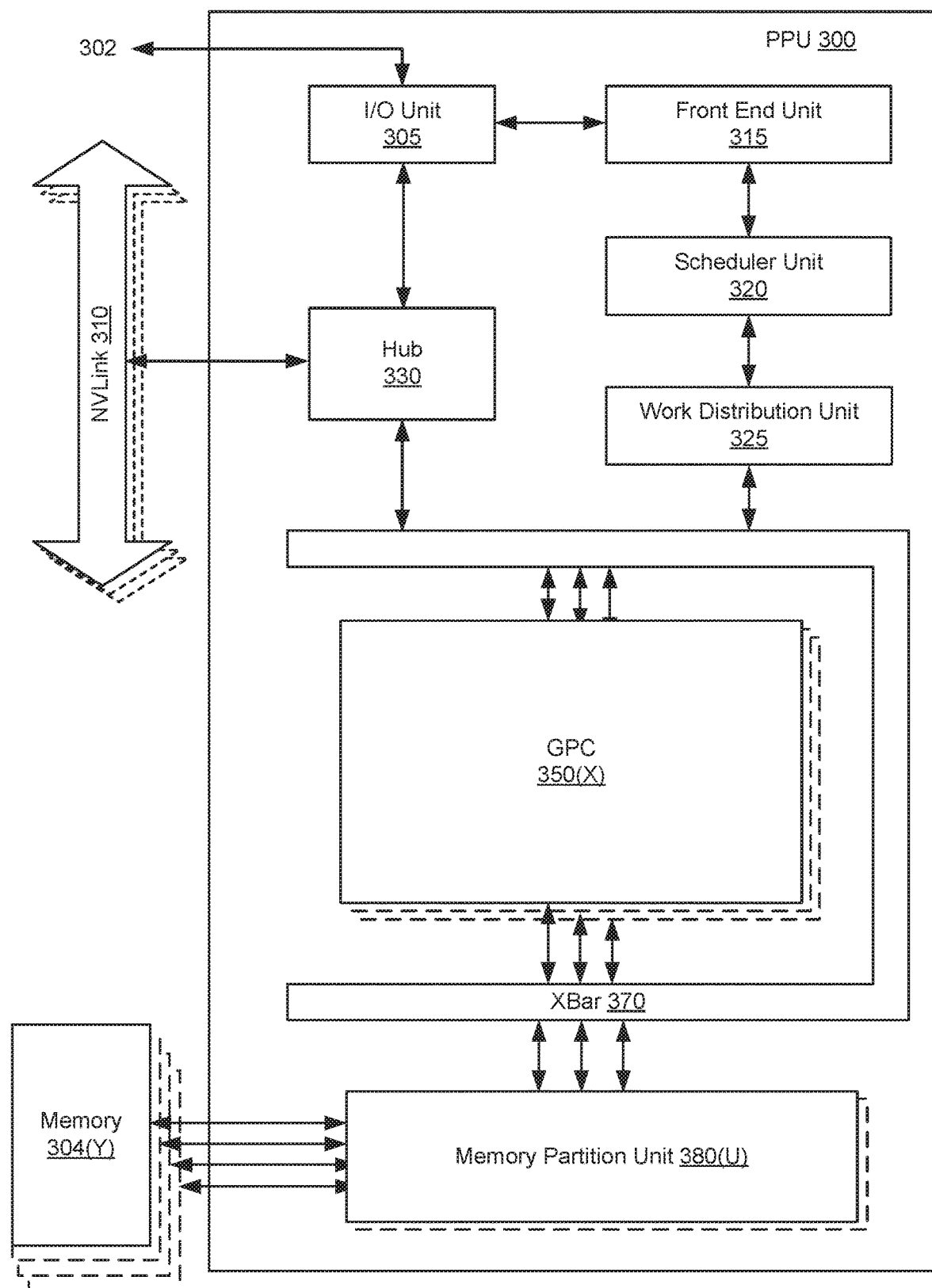
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
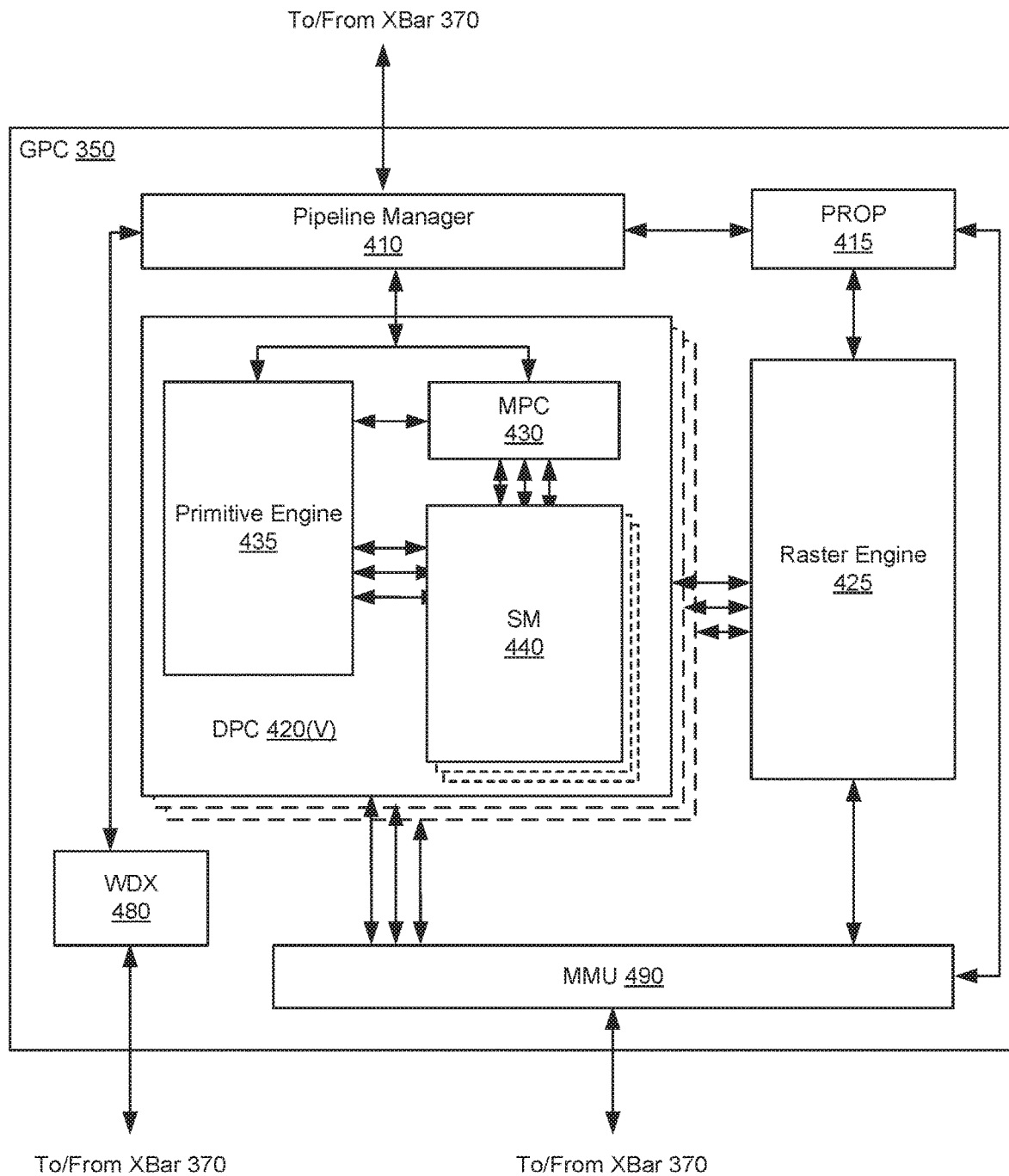
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
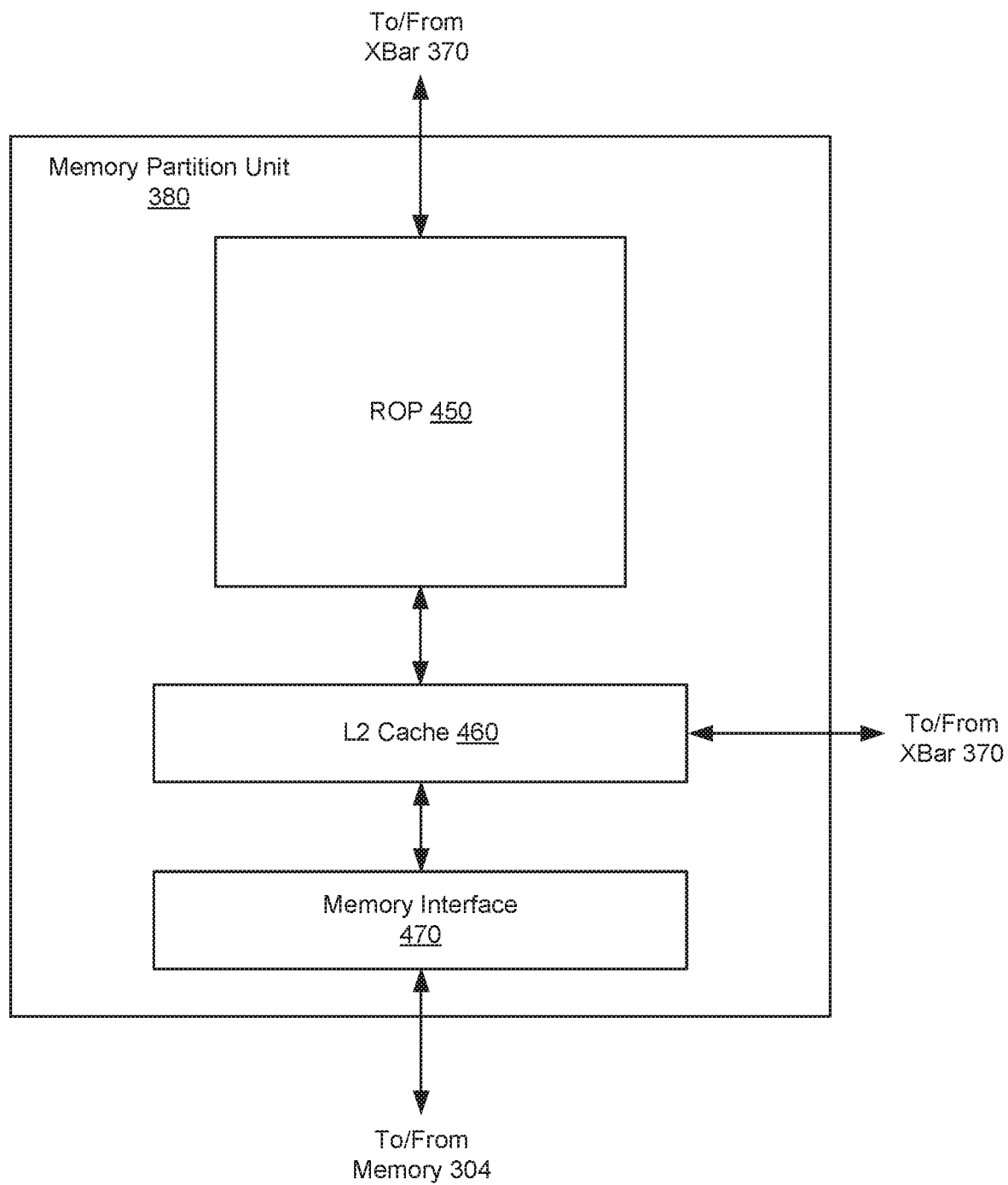
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single- Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
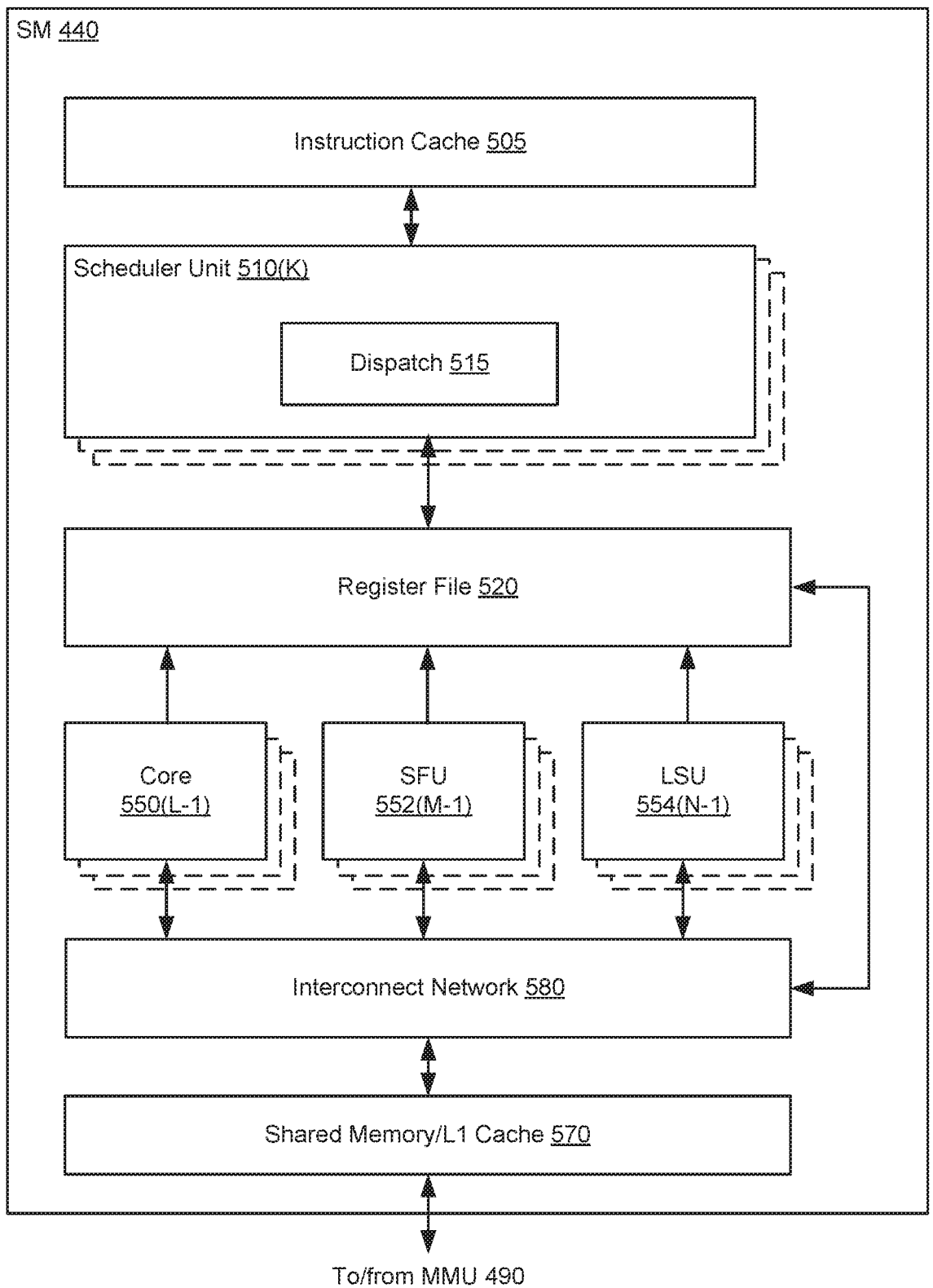
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300.

The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
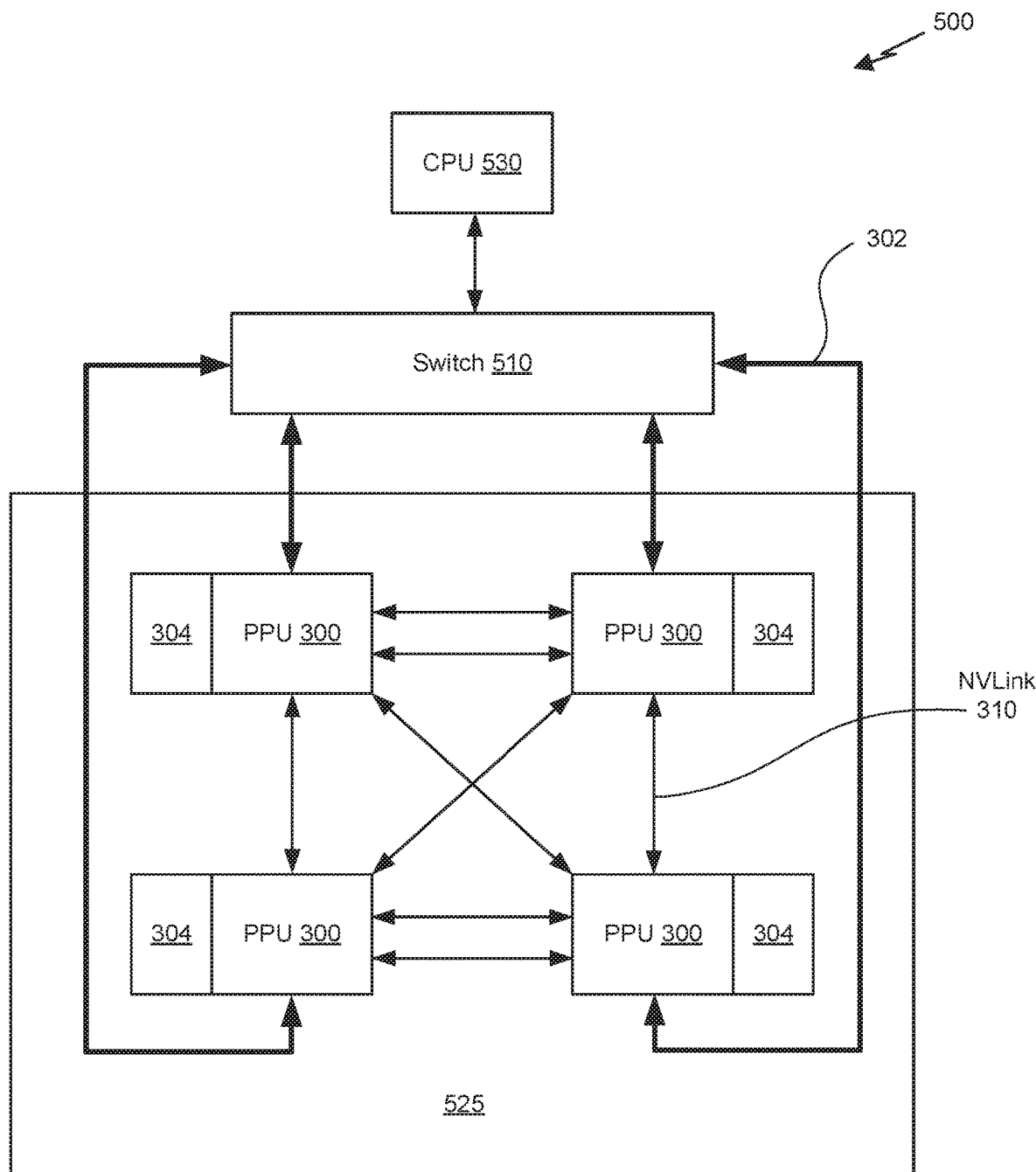
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each coupled to respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
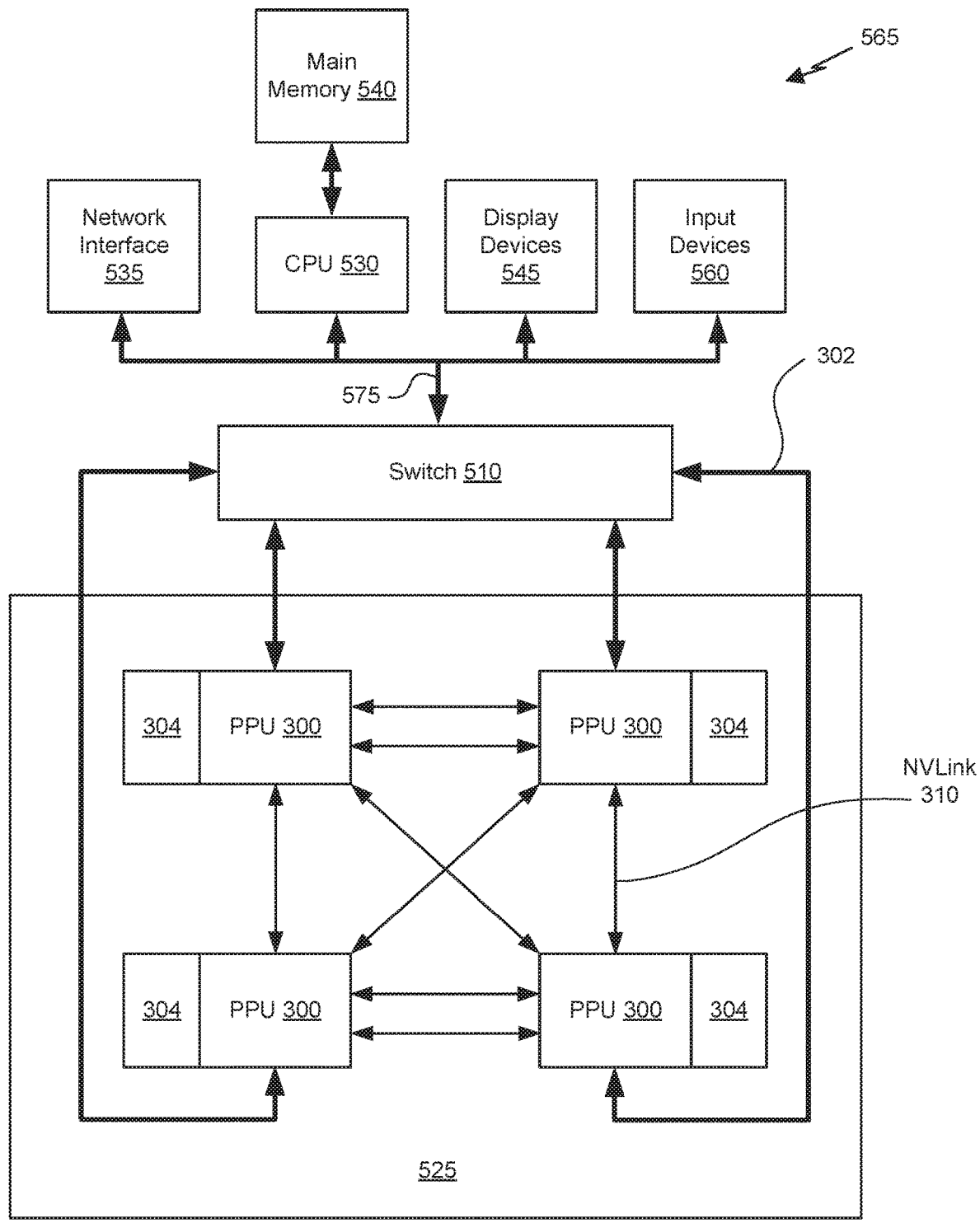
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

Figure 6A:
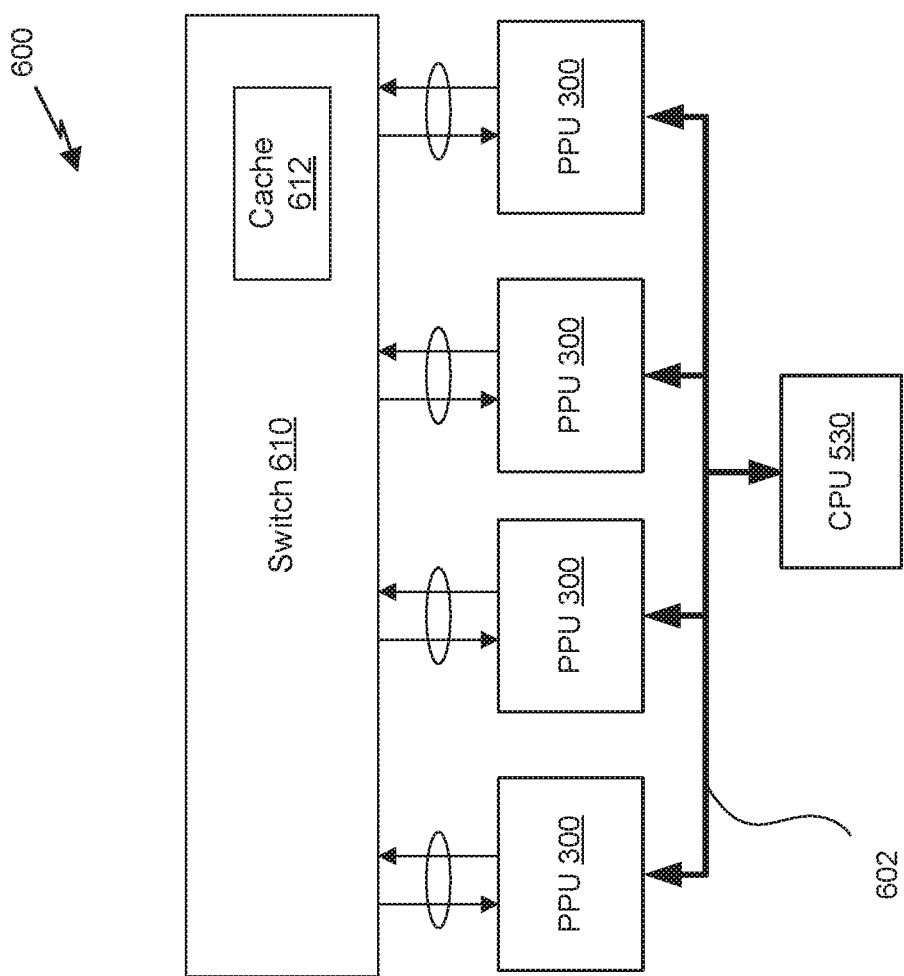
FIG. 6 is a conceptual illustration of a data parallel training task implemented on a number of PPUs, in accordance with the prior art.

FIG. 6A is a conceptual illustration of a processing system 600 utilizing multiple PPUs 300, in accordance with an embodiment. As depicted in FIG. 6A, the system includes a host CPU 530 and a number of PPUs 300 connected via a system bus 602. In an embodiment, the system 600 includes four PPUs 300. However, the system 600 is not limited to four PPUs 300 and the number of PPUs 300 connected to the CPU 530 via the system bus 602 can be less than or greater than four PPUs 300, provided that the bandwidth of the system bus 602 can support the number of PPUs 300. Although not shown explicitly, each of the PPUs 300 can be connected to a local memory 304 through a separate interface implemented by the PPU 300.

As depicted in FIG. 6A, the four PPUs 300 are connected to a switch 610. In an embodiment, the switch 610 is an integrated circuit that includes a number of communication ports, each communication port configured to implement a bi-directional communication link such as the NVLink 310 interface of FIGS. 5B and 5C. The switch 610 includes a fully-connected crossbar such that any signal received via one communication port can be routed to another communication port. The switch 610 can also include logic such as a cache 612 for decreasing latency of remote memory accesses or a fabric manager for implementing various security features such as limiting access by certain applications to specific memory address ranges.

In one embodiment, each PPU 300 implements at least three bi-directional communication ports, where one communications port is connected to the switch 610 for each of the other PPUs 300 included in the system 600. Consequently, the switch 610 implements at least twelve communication ports, with three communication ports connected to each of the four PPUs 300.

Figure 6B:
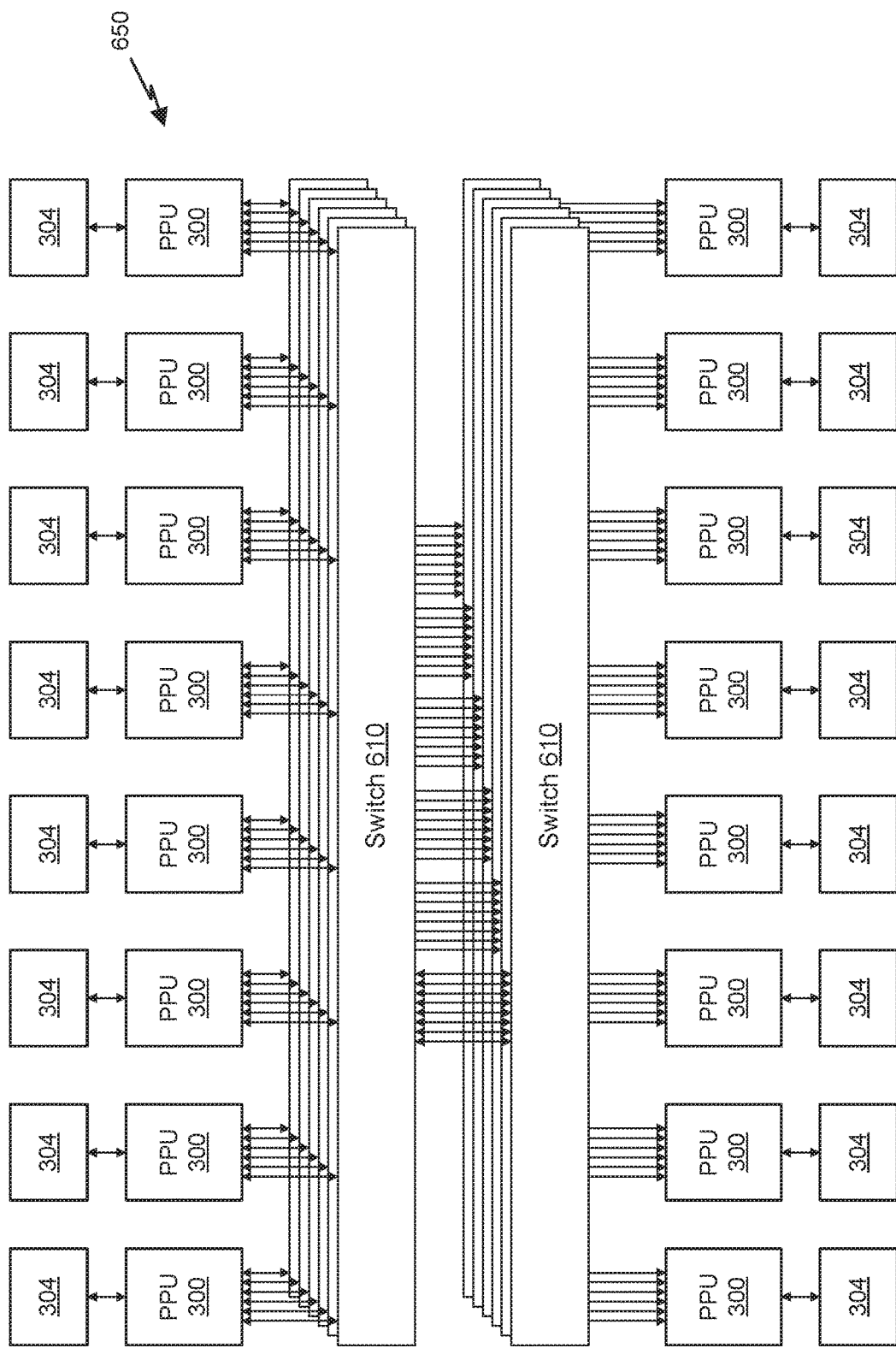

FIG. 6B is a conceptual illustration of a processing system 650 utilizing multiple PPUs 300, in accordance with another embodiment. In comparison with the system 600 of FIG. 6A, the system 650 includes a much larger number of PPUs 300. In one embodiment, the system 650 includes 16 PPUs 300. Each PPU 300 can be coupled to a local memory 304. The operation and structure of the PPUs 300 and memories 304 is similar to that shown in FIG. 3 and described in more detail above.

The PPUs 300 can be divided into two groups: a first group comprising 8 PPUs 300 located on the upper half of FIG. 6B and a second group comprising 8 PPUs 300 located on the lower half of FIG. 6B. Each group of PPUs 300 is connected to a corresponding set of one or more switches 610. It will be appreciated that the switch 610 of FIG. 6A can be limited to have a certain number of communication ports (e.g., 18 communication ports) simply due to the number of structures (e.g., transistors, interconnects, etc.) that are required to be implemented within the integrated circuit for each communication port. A single switch connected to all 16 PPUs 300 would therefore require 15 communications ports per PPU, for a total of 240 communication ports, which is likely not feasible on a single integrated circuit die. Consequently, when the number of PPUs 300 in the system 650 exceeds a particular limit, multiple switches 610 are included in the system 650 in order to enable communications between any PPU 300 and any of the other PPUs 300.

In an embodiment, each group of eight PPUs 300 is connected to a set of six switches 610. Each PPU 300 is coupled to each of the six switches 610 via a communications link. Consequently, each switch 610 is coupled to eight PPUs 300 in the group via eight of the communications ports implemented by the switch 610. Thus, any PPU 300 in a particular group can communicate with any of the other PPUs 300 in the group via one or more of the corresponding switches 610.

The PPUs 300 in one group can also communicate with the PPUs 300 in the other group via corresponding connections between the two groups of six switches 610. In an embodiment, eight communication ports of each switch 610 in the first group are coupled to eight communication ports of a corresponding switch 610 in the other group. A PPU 300 in one group can then communicate with any of the eight PPUs 300 in the other group by routing the communications through a pair of switches 610.

It will be appreciated that the system 650 can be adapted for a different number of PPUs 300 by using a different number and arrangement of switches 610. Furthermore, although not shown explicitly in FIG. 6B, each of the switches 610 can include a separate cache 612.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Distributed Batch Normalization Using Partial Populations

Figure 7:
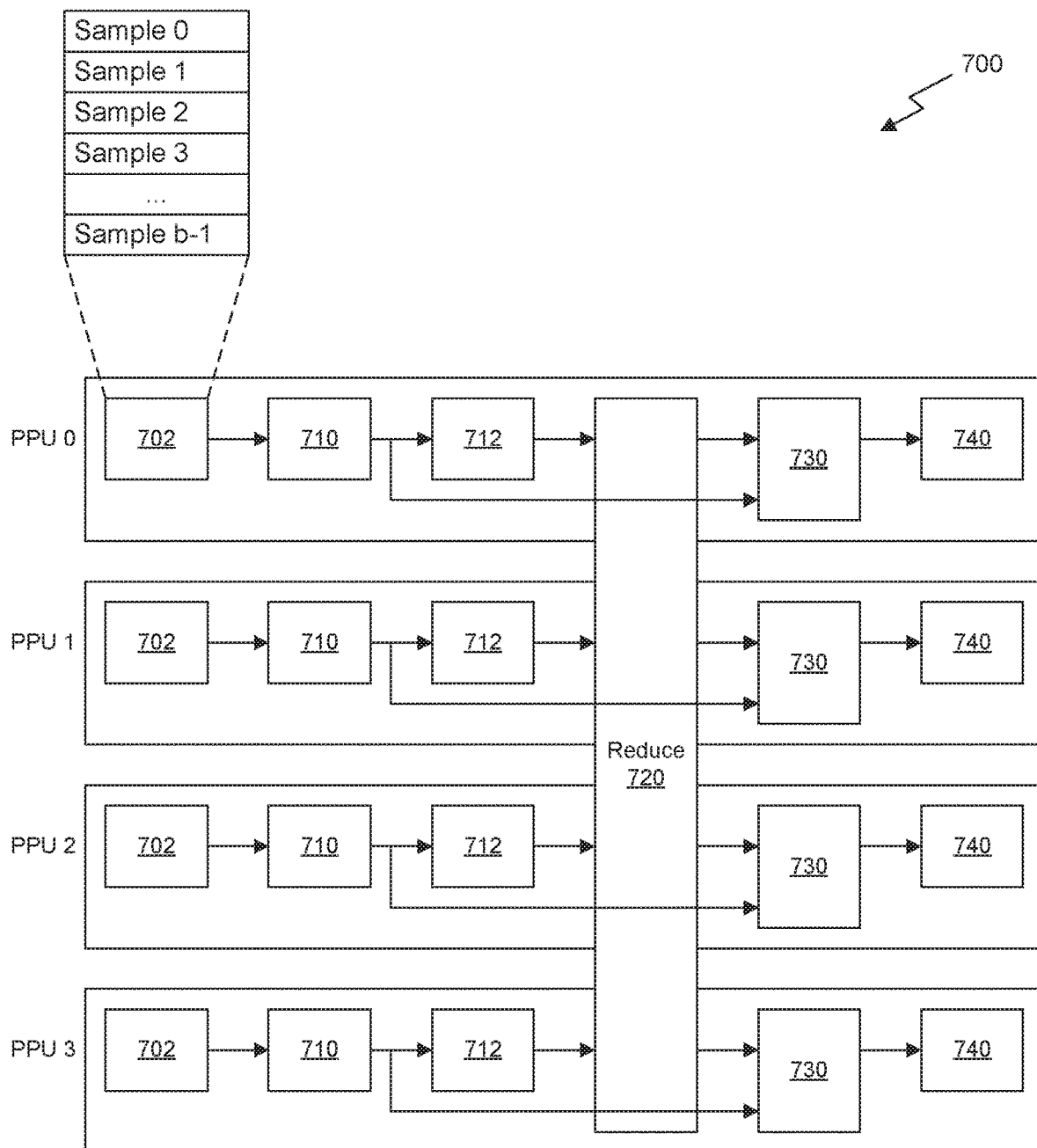
FIG. 7 is a conceptual illustration of a data parallel training task implemented on a number of PPUs, in accordance with the prior art.

FIG. 7 is a conceptual illustration of a data parallel training task 700 implemented on a number of PPUs, in accordance with the prior art. Each PPU can be similar to PPU 300, discussed above. As used herein, a set of training data is referred to as a batch. The batch can be divided into subsets of mini-batches, where each mini-batch is a subset of the training data that is processed by the GPUs and then analyzed to update the attributes of the neural network model during a single training iteration. For example, the batch might contain 20,000 training samples, and the mini-batch could contain 1,000 training samples randomly selected from the batch. Each mini-batch can be further divided into sub-batches, each sub-batch being distributed to a particular PPU for processing. For example, each mini-batch might be divided into sub-batches of 16 or 32 training samples that are distributed to the available PPUs in a round-robin fashion.

In a conventional data parallel training task using batch normalization, each PPU receives a sub-batch 702 of training samples. As depicted in FIG. 7, the sub-batch 702 contains b training samples (e.g., 8, 16, or 32 training samples). The sub-batch 702 is provided as the input X to a layer 710 of the neural network model that applies a function to the input X. The outputs of the layer 710 are analyzed by a statistical unit 712 that generates statistical measures for the training samples of the sub-batch 702. In one embodiment, the statistical unit 712 calculates a mean value and/or a variance value for each channel of the output of the layer 710 over the subset of b training samples.

The statistical measures generated by the statistical unit 712 for the sub-batch 702 allocated to that PPU are then shared with the other PPUs via a distributed reduce operation 720. In one embodiment, the distributed reduce operation 720 is implemented in a separate processor, such as a host CPU or an additional PPU, not explicitly shown in FIG. 7. The distributed reduce operation 720 combines the statistical measures from the plurality of PPUs to generate statistical measures for the mini-batch. The statistical measures for the mini-batch, such as a mean value and/or a variance value for each channel of the output of the layer 710, are associated with a much larger number of training samples than the statistical measures generated by each PPU for a particular sub-batch. Normalization parameters based on the statistical measures for the mini-batch are generated by the distributed reduce operation 720 and shared with or transmitted to each of the PPUs. In some embodiments, the normalization parameters comprise a mean value and/or a variance for each channel of the output of the layer 710. A normalization unit 730 then normalizes all of the outputs of the layer 710 in accordance with the normalization parameters to generate the output 740. Although not shown explicitly in FIG. 6, an activation function can be applied to the normalized elements output by the normalization unit 730 prior to passing the output 740 to the next layer of the neural network model.

It will be appreciated that there is a bottleneck in the data parallel training task 700 at the distributed reduce operation 720. First, in order to generate the statistical measures at the statistical unit 712, all of the training samples in the sub-batch 702 must be processed by the layer 710. Consequently, there is a delay between the start of processing of the sub-batch 702 and the start of the distributed reduce operation 720. Each of the PPUs then transmits the calculated statistical measures to the processor that is configured to collect statistical measures and generate the normalization parameters. It is likely that, due to varying latencies of the memory operations associated with processing the sub-batch 702 by the layer 710, the statistical measures arrive at the processor at different times and the normalization parameters can only be calculated after all of the statistical measures have arrived from the full set of PPUs. Thus, each PPU stalls after transmitting the statistical measures to the remote processor and waits to receive the normalization parameters from the remote processor. This can create a significant inefficiency that increases the total training time of the neural network model. It will be appreciated that many of these delays may be relatively small (e.g., small fractions of a second), however, this set of operations must be repeated for each layer of the neural network model, and many neural network models include a large number of dependent layers (e.g., 50-100) that are processed in sequence. Consequently, the bottleneck experienced at the distributed reduce operation 720 can increase the training time for the neural network model significantly.

One potential solution to this issue is to generate normalization parameters separately at each PPU based only on the outputs of the layer 710 for a particular sub-batch, which can be referred to as sub-batch normalization. In other words, each PPU can calculate the normalization parameters utilized by that PPU based on the small number of training samples for the sub-batch. While this may work when the size of the sub-batch is large, providing a statistically significant sample of the mini-batch, this solution breaks down when the size of the sub-batch is small (e.g., 2, 4, or 8 training samples per sub-batch). In such small sub-batches, it is more likely that the small number of training samples include outliers that skew the normalization parameters utilized by the normalization unit 730, which slows the convergence of the attributes of the neural network model during training. Where the size of the mini-batch is fixed, this can effectively limit the number of PPUs that can be utilized to perform data parallel training to ensure that the size of the sub-batch is above a threshold value that represents a statistically significant population of the mini-batch.

Another potential solution to this issue that has better results associated with sub-batches of limited size is described below. This solution has better performance when scaling the data parallel training task to a large number of PPUs, thereby decreasing the size of each sub-batch when the mini-batch remains fixed.

Figure 8:
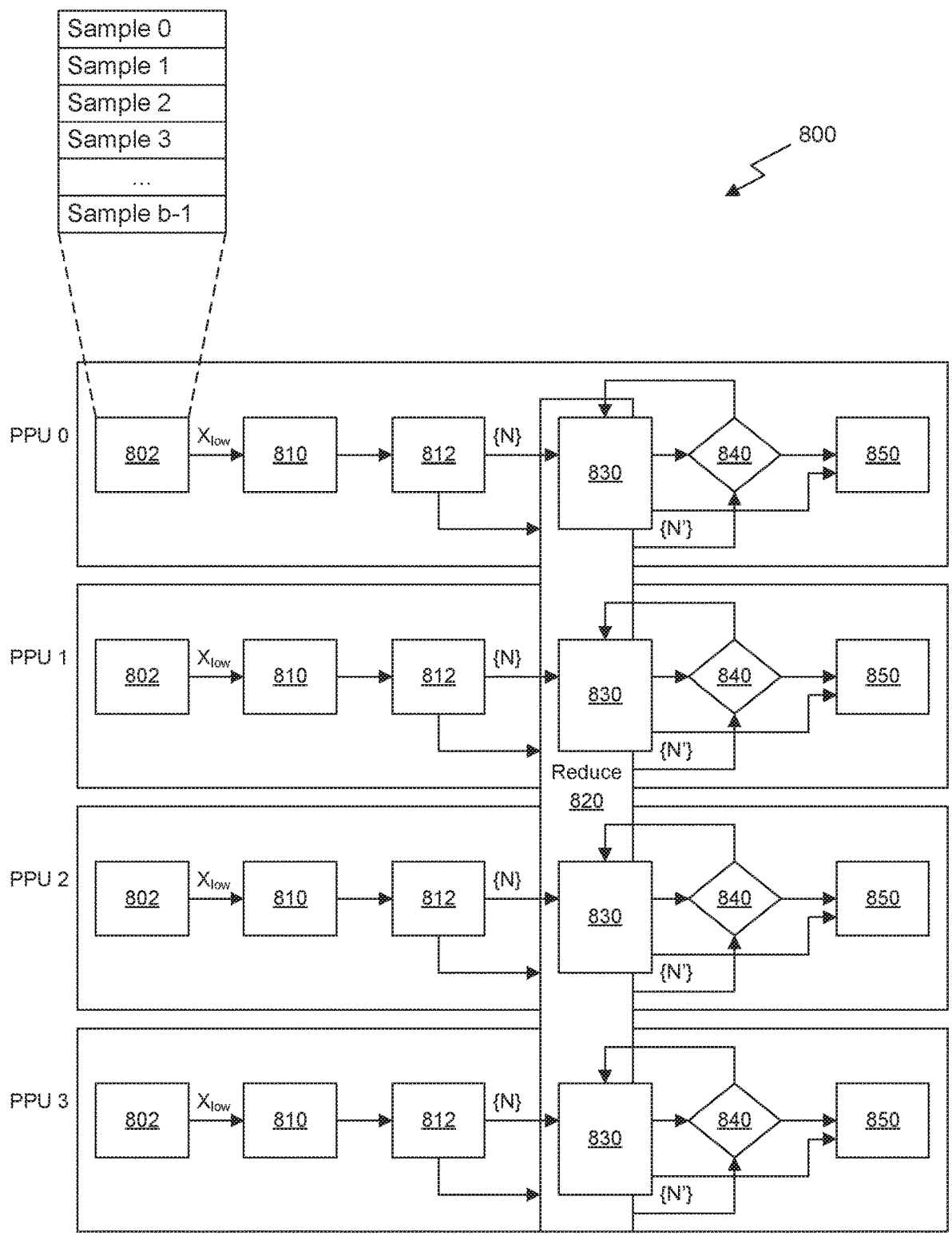
FIG. 8 is a conceptual illustration of a data parallel training task implemented on a number of PPUs, in accordance with some embodiments.

FIG. 8 is a conceptual illustration of a data parallel training task 800 implemented on a number of PPUs, in accordance with some embodiments. A mini-batch of training samples is divided into a number of sub-batches 802 that are allocated to a number of PPUs 300 to process in parallel.

In one embodiment, each training sample, X, is passed as input to a layer 810 of the neural network model, which generates an output, F(X). Each of the b training samples in the sub-batch 802 are processed sequentially by the layer 810 and the set of outputs F(X), which contain the activations, for the training samples are passed to a statistical unit 812.

The statistical unit 812 performs two functions. First, the statistical unit 812 generates statistical measures for the training samples of the sub-batch 802. In one embodiment, the statistical unit 812 calculates a mean value and/or a variance for each channel of the output of the layer 810 over the subset of b training samples. The statistical measures are forwarded to a reduce operation 820 that combines statistical measures generated by a plurality of PPUs 300 to generate normalization parameters, {N} for the mini-batch. However, due to the potential for delay between generating the statistical measures and receiving the normalization parameters from the reduce operation 820, the statistical unit 812 also performs a second function: generating estimated normalization parameters, {N'} based on the statistical measures for the sub-batch 802.

It will be appreciated that the statistical measures, such as mean and variance, for the training samples in the sub-batch 802 may be different from the statistical measures for the training samples in the mini-batch. This is because a mean value calculated for the sample, here the outputs F(X) for the training samples in the sub-batch 802, is not likely to exactly match the mean value for the population, which in this case includes the outputs F(X) for the training samples over the entire mini-batch. However, in many cases, the samples included in the sub-batch will be representative of the entire population of the mini-batch and, therefore, the statistical measures for the sub-batch will sometimes be close to the statistical measures for the mini-batch. In those cases, time can be saved by performing a speculative normalization operation using the estimated normalization parameters and then checking the accuracy of the estimated normalization parameters against the normalization parameters received as a result of the reduce operation 820 at a later point in time, leveraging the already normalized activations if the estimated normalization parameters are found to be accurate, in order to reduce the time required to complete the normalization operation, or discarding the already normalized activations if the estimated normalization parameters are found to be not accurate, therefore re-processing the outputs with the new normalization parameters received from the reduce operation 820. In general, this technique can be referred to as speculative normalization with rollback.

As depicted in FIG. 8, a normalization unit 830 performs a speculative normalization operation in parallel with the reduce operation 820. The speculative normalization operation is applied to at least a portion of the outputs F(X) for the training samples of the sub-batch 802. At a later point in time, a speculative rollback unit 840 receives the normalization parameters, {N}, from the reduce operation 820. The speculative rollback unit 840 compares the normalization parameters to the estimated normalization parameters to determine if the estimated normalization parameters were accurate.

In one embodiment, the estimated normalization parameters include an estimated mean value and an estimated variance for each channel of the output F(X) for the training samples of the sub-batch 802. The normalization parameters include a mean value and a variance for each channel of the output F(X) for the training samples of the mini-batch. Accuracy is determined by comparing the estimated mean value from the estimated normalization parameters to the mean value from the normalization parameters. If the difference between the estimated mean and the mean is less than a threshold value, then the estimated normalization parameters are accurate and the normalized activations calculated by the normalization unit 830 can be kept as the output. However, if the difference between the estimated mean value and the mean value is greater than the threshold value, then the estimated normalization parameters are not accurate and the normalized activations calculated by the normalization unit 830 are discarded. The speculative rollback unit 840 provides the normalization parameters {N} from the reduce operation 820 to the normalization unit 830, which normalizes the outputs F(X) for the training samples of the sub-batch 802 using the normalization parameters {N}.

In some embodiments, the threshold value for accuracy is calculated dynamically based on the variance received in the normalization parameters from the reduce operation 820. For example, if the estimated mean is within some number of units of the standard deviation (e.g., the square root of the variance), then the estimated mean is considered to be close enough to the actual mean of the population of the mini-batch to be representative as accurate. In one exemplary embodiment, the threshold value is equal to a fraction of the standard deviation of the mean, such as $\Delta_t = \omega\sigma = 0.5\sigma$. In some embodiments, the weight $\omega$ can be adjusted manually to reflect the accuracy required by a specific application. For example, a programmer may adjust the weight $\omega$ such that rollback is required approximately 10% of the time during a specific training epoch.

It will be appreciated that while the rollback operation can be costly in terms of the time required to re-process the activations and the amount of memory that may be required to store the intermediate values of the outputs, in practice, the number of times rollback operations are required can be quite low where the sub-batch is well-distributed as a sample of the population. Therefore, speculative execution of the normalization operation can actually be quite beneficial where the sub-batch 802 is commonly found to be a "good-enough" representation of the population. A majority of the latency associated with the distributed reduce operation 820 can be hidden when the rollback operation is not required.

In some embodiments, the estimated normalization parameters and the corresponding normalization parameters include a mean value/variance pair for each channel of the output F(X). In other words, some portion of the estimated normalization parameters might be determined to be accurate while another portion of the estimated normalization parameters are determined to be inaccurate. In one embodiment, if any of the normalization parameters are determined to be inaccurate, then the rollback operation re-normalizes all of the channels of the output using the updated normalization parameters {N}. In another embodiment, the rollback operation only re-normalizes those channels of the output associated with the inaccurate estimated normalization parameters {N}. In such embodiments, a binary mask can be used to identify the channels of the output that are associated with accurate or inaccurate estimated normalization parameters, and the binary mask can be used to combine a subset of a re-normalized output computed using the updated normalization parameters {N} with a complementary portion of the pre-computed normalized output using the estimated normalization parameters {N'}.

In one embodiment, the data parallel training task 800 can be implemented on the systems 600 or 650 depicted in FIG. 6A or 6B. More specifically, a host processor (e.g., CPU 530) can manage the data parallel training task 800 by identifying a mini-batch from a set of training samples, divide the mini-batch into a plurality of sub-batches, and allocate each sub-batch 802 to a PPU 300 for processing. Each PPU 300 can implement the layer 810 and the statistical unit 812 for processing the training samples for the sub-batch 802 to generate the activations and corresponding statistical measures for the estimated normalization parameters {N'}. The training sample data as well as the processed data can be stored in the local memories 304 associated with each PPU 300.

Once the statistical unit 812 in each PPU 300 has generated the statistical measures for the sub-batch 802 allocated to that PPU 300, the PPU 300 transmits the statistical measures to the switch 610. The estimated normalization parameters, {N'}, based on the statistical measures for the sub-batch, are also forwarded to the normalization unit 830 to begin execution of the speculative normalization operation.

In one embodiment, the switch 610 includes a processor that is configured to perform the distributed reduce operation 820. The switch 610 calculates the normalization parameters {N} for the mini-batch and forwards the normalization parameters to each of the PPUs 300. In another embodiment, the switch 610 forwards the statistical measures to another processor, such as the CPU 530, one of the PPUs 300, or a separate processing unit available via a network. The other processor is configured to perform the distributed reduce operation 820 and transmit the normalization parameters back to the switch 610, which forwards the normalization parameters to each of the PPUs 300.

While waiting for the normalization parameters, each PPU 300 continues to process the outputs for the sub-batch 802 allocated to that PPU 300 by the normalization unit 830. The outputs generated by the normalization unit 830 using the estimated normalization parameters {N'} can be temporarily stored in the memory 304 for the PPU 300 while waiting for the normalization parameters {N} to be received from the switch 610. Once the normalization parameters have been received, the PPU 300, via the speculative rollback unit 840, determines whether to perform the rollback operation using the updated normalization parameters. As used herein, the speculative rollback unit 840 can comprise a thread or group of threads that is configured to determine the accuracy of the estimated normalization parameters based on the normalization parameters received from the switch 610.

In some embodiments, the distributed reduce operation 820 is implemented by writing the statistical measures to broadcast addresses in a virtual address space. More specifically, a virtual address space can be defined that includes a first range of addresses that are associated with a local memory, such as memory 304, and a second range of addresses that are associated with a broadcast operation. When a PPU 300 writes a value to a virtual address in the first range of addresses, the MMU 490 can write the value to a cache line in the L2 cache 460 and/or write the value out to the memory 304 via the memory interface 470. However, when the PPU 300 writes a value to a virtual address in the second range of addresses, the MMU 490 interprets this address to transmit a broadcast write request to the switch 610. The switch 610 receives the broadcast write request and adds the value included in the broadcast write request to a value stored in a register associated with the virtual memory address. The switch 610 can also increment a counter associated with the particular virtual memory address that indicates the number of broadcast write requests received for that virtual memory address. The switch 610 is configured to continue to add all of the values for a number of broadcast write requests received from a plurality of PPUs 300 connected to the switch 610 until the value in the counter exceeds a threshold value. Once the counter exceeds this threshold value, then the sum in the register is forwarded to each of the PPUs 300 connected to the switch 610 and written to a local memory address associated with the first range of virtual memory addresses. Consequently, in some embodiments, the switch 610 implements the distributed reduce operation 820 via this mechanism associated with the broadcast memory address.

In some embodiments, the sums received back from the switch 610 can be provided as input to another mathematical operation implemented by the PPU 300 that is configured to calculate the normalization parameters based on the sums. In another embodiment, the switch 610 can be configured to generate the normalization parameters once the counter exceeds the threshold value and then forward the normalization parameters to the PPUs 300.

In some embodiments, the distributed reduce operation 820 comprises a weighted average of the statistical measures from each of the PPUs 300, where the weights are related to the number of samples used to calculate the statistical measure by each PPU 300. Assuming each PPU 300 uses the same number of samples to calculate the statistical measure for that processor, then the weights are the same and sum to unity meaning the reduce operation 820 yields a simple average of the statistical measures from each of the PPUs 300.

In some embodiments, the result of the distributed reduce operation 820 has a precision that is greater than the precision of the statistical measures generated by each of the individual PPUs 300. For example, a precision of the mean or variance for a small number of samples of a sub-batch 820 can be calculated in FP32 (e.g., 32-bit floating point) by each of the PPUs 300. However, a precision of the mean value or variance of the mini-batch, calculated by the switch 610 or an additional processor, can be calculated in FP64 (e.g., 64-bit floating point). In other embodiments, different precision can be used for storing the values of the statistical measures (e.g., 16-bit and 24-bit, 32-bit and 64-bit, etc.).

Figure 9:
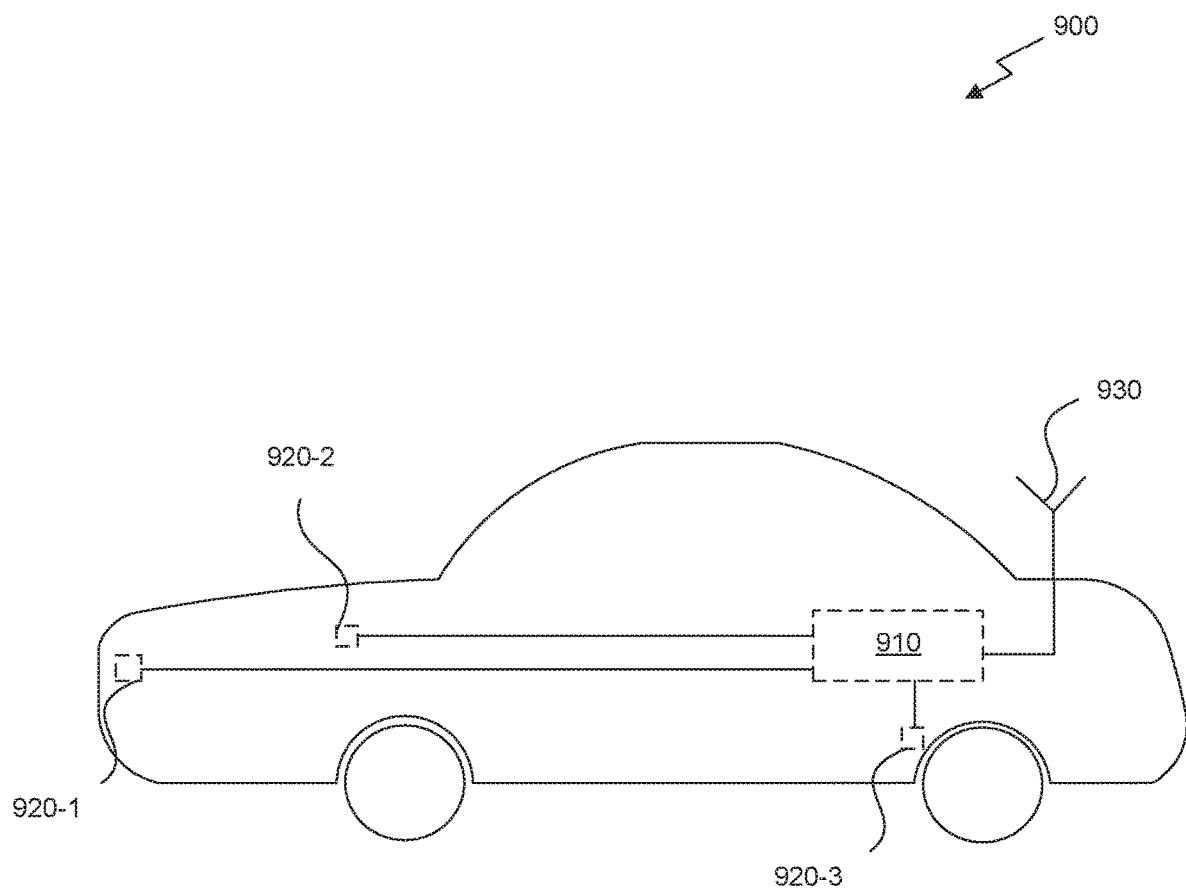
FIG. 9 illustrates an autonomous vehicle that utilizes a neural network model, in accordance with some embodiments.

FIG. 9 illustrates an autonomous vehicle 900 that utilizes a neural network model, in accordance with some embodiments. The use of inferencing using neural network models has many applications, but one of the applications that is currently being developed is the use of neural network models to aid in operation of autonomous vehicles 900 like self-driving cars. Inferencing can be used for object detection in collision avoidance systems or to predict inputs to direct the vehicle direction and/or speed, among other uses.

As depicted in FIG. 9, an autonomous vehicle 900 can include, in addition to conventional vehicle systems, a deep learning sub-system 910. In one embodiment, the deep-learning sub-system 910 can include the processing system 650 illustrated in FIG. 6B. The plurality of PPUs 300 can be configured to train the neural network model in-situ within the autonomous vehicle in accordance with the techniques and methods set forth above. For example, each PPU 300 can process a first portion of a sub-batch of training samples assigned to the PPU 300 to generate a statistical measure, transmit the statistical measure to at least one additional processor to generate the normalization parameters, process a second portion of the sub-batch of training samples using estimated normalization parameters, receive the normalization parameters from the at least one additional processor, and determine whether to roll back the operation by comparing the estimated normalization parameters with the received normalization parameters. The at least one additional processor can be implemented within the switch 610, on one or more of the PPUs 300, or within a separate processor in communication with the PPUs 300 through, e.g., an interface implemented by the switch 610 or some other high speed bus.

In other embodiments, the deep-learning sub-system 910 can include a processor configured to implement at least a portion of the neural network model to generate activations for a batch of training samples. The processor can also analyze the activations to generate the statistical measure, transmit the statistical measure to at least one additional processor configured to generate normalization parameters, and receive the normalization parameters from the at least one additional processor. Although the at least one additional processor can be included in the autonomous vehicle 900, the at least one additional processor is not limited to being included within the autonomous vehicle 900 and can be located remotely from the autonomous vehicle 900. In some embodiments, the autonomous vehicle 900 can include an antenna 930 and the deep learning sub-system 910 can include a transceiver that is configured to transmit the statistical measure(s) to the at least one additional processor and receive the normalization parameters from the at least one additional processor.

In some embodiments, the autonomous vehicle 900 includes a network of one or more sensors 920. The sensors can be utilized to generate inputs analyzed by the neural network model for performing inferencing. For example, a first sensor 920-1 could be a camera that samples an image for use in detecting objects in front of the vehicle's path of travel. The neural network model can analyze the image to predict objects in the image that are tracked by a collision avoidance system. As another example, a second sensor 920-2 can interface with an engine control unit (ECU) of a vehicle to track operating parameters of the vehicle such as engine rpm, throttle position, steering wheel position, transmission gear selected, and so forth. As yet another example, a third sensor 920-3 can track motion of one or more wheels for estimated vehicle speed. The particular sensors 920 included in the autonomous vehicle 900 can depend on the type of inferencing being done by the neural network model and what inputs or information are included in the feature vector supplied to the neural network model.

In some embodiments, the sensors 920 can be used to generate training samples for training or refining the neural network model. For example, a user can operate the vehicle 900 manually while the sensors 920 collect new training samples that, when used to train the neural network model, result in the neural network model generating behavior that is tailored to the user's prior operation of the vehicle 900. Once the neural network model is trained, the vehicle 900 can be operated autonomously. In other embodiments, the sensors 920 can provide feedback that is used to refine the neural network model. In such embodiments, the neural network model can be trained using a set of training samples that are provided to the deep learning sub-system. However, further refinement of the neural network model can be made based on additional training samples generated by the sensors 920 during autonomous operation (e.g., based on corrective action taken by a driver that overrides the autonomous operation).

It will be appreciated that although FIG. 9 illustrates the autonomous vehicle 900 as a car or automobile, the autonomous vehicle 900 is not so limited. Various implementations of the autonomous vehicle can take the form of an automobile, a truck, a ship, an aircraft, a spacecraft, or an armored vehicle. For example, the autonomous vehicle 900 can be an unmanned aerial vehicle (UAV), an armored personnel carrier or tank, a rocket traveling in low-earth orbit, a naval vessel, container ship, submarine, or various other types of manned or unmanned vehicles.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed.

All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for training a neural network model, comprising:
   processing, by at least one processor in a plurality of processors, a set of training samples allocated to the at least one processor by a layer of the neural network model to generate activations;
   analyzing, by the at least one processor, the activations to calculate a statistical measure associated with the activations for the at least one sample;
   generating, by the at least one processor, estimated normalization parameters based on the statistical measure;
   applying, in a speculative normalization operation by the at least one processor, the estimated normalization parameters to at least a portion of the activations to generate normalized activations;
   transmitting the statistical measure to at least one additional processor connected to the plurality of processors, the at least one additional processor configured to reduce multiple statistical measures received from the plurality of processors to generate normalization parameters;
   receiving the normalization parameters from the at least one additional processor; and
   reverting the speculative normalization operation to a pre-normalization state when the estimated normalization parameters are outside of an acceptable range of the normalization parameters received from the at least one additional processor.

2. The computer-implemented method of claim 1, wherein the statistical measure associated with the activations is calculated based on an analysis of activations for all training samples in the set of training samples allocated to the processor.

3. The computer-implemented method of claim 1, wherein reverting the speculative normalization operation to a pre-normalization state comprises invalidating the normalized activations stored in a memory.

4. The computer-implemented method of claim 3, further comprising:
applying, in a second normalization operation, the normalization parameters to the activations to generate normalized activations; and
providing the normalized activations as a feature vector to a particular processor in the plurality of processors configured to implement a subsequent layer of the neural network model.

5. The computer-implemented method of claim 1, wherein reverting the speculative normalization operation to a pre-normalization state comprises invalidating at least one operation associated with a subsequent layer of the neural network model configured to process the normalized activations generated during the speculative normalization operation.

6. The computer-implemented method of claim 1, wherein the estimated normalization parameters are outside of the acceptable range of the normalization parameters when a difference between the estimated normalization parameters and the normalization parameters is greater than a threshold value.

7. The computer-implemented method of claim 6, wherein the threshold value is based on a variance included in the normalization parameters.

8. The computer-implemented method of claim 1, wherein analyzing the activations comprises calculating at least one of a mean value or a variance for the activations.

9. The computer-implemented method of claim 1, wherein the estimated normalization parameters and the normalization parameters comprise a mean value and a variance for each channel of the activations.

10. The computer-implemented method of claim 9, wherein reverting the speculative normalization operation to a pre-normalization state comprises re-normalizing a subset of the channels of the activations based on a binary mask that identifies whether each channel of the activations corresponds with accurate or inaccurate estimated normalization parameters.

11. A system, comprising:
at least one processor configured to:
process a set of training samples allocated to the at least one processor by a layer of a neural network model to generate activations,
analyze the activations to calculate a statistical measure associated with the activations for the at least one sample,
generate estimated normalization parameters based on the statistical measure, apply, in a speculative normalization operation, the estimated normalization parameters to at least a portion of the activations to generate normalized activations, and
revert the speculative normalization operation to a pre-normalization state when the estimated normalization parameters are outside of an acceptable range of normalization parameters received via a network; and
at least one additional processor in communication with the at least one processor and configured to:
receive multiple statistical measures from a plurality of processors, the multiple statistical measures including the statistical measure calculated by the at least one processor,
reduce the multiple statistical measures received from the plurality of processors to generate normalization parameters associated with the layer of the neural network model, and
transmit the normalization parameters to each of the processors in the plurality of processors via the network,
wherein the speculative normalization operation is performed in parallel with the at least one additional processor generating the normalization parameters.

12. The system of claim 11, wherein the statistical measure associated with the activations is calculated based on an analysis of activations for all training samples in the set of training samples allocated to the at least one processor.

13. The system of claim 11, wherein reverting the speculative normalization operation to a pre-normalization state comprises invalidating the normalized activations stored in a local memory for the at least one processor.

14. The system of claim 11, wherein the estimated normalization parameters are outside of the acceptable range of the normalization parameters when a difference between the estimated normalization parameters and the normalization parameters is greater than a threshold value.

15. The system of claim 14, wherein the threshold value is based on a variance included in the normalization parameters.

16. The system of claim 11, wherein analyzing the activations comprises calculating at least one of a mean value or a variance for the activations.

17. The system of claim 11, wherein the estimated normalization parameters and the normalization parameters comprise a mean value and a variance for each channel of the activations.

18. A non-transitory computer-readable media storing computer instructions for training a neural network model that, when executed by one or more processors, cause the one or more processors to perform the steps of:
processing a set of training samples allocated to the one or more processors by a layer of the neural network model to generate activations;
analyzing the activations to calculate a statistical measure associated with the activations for the at least one sample;
generating estimated normalization parameters based on the statistical measure;
applying, in a speculative normalization operation, the estimated normalization parameters to at least a portion of the activations to generate normalized activations;
transmitting the statistical measure to at least one additional processor connected to the one or more processors, the at least one additional processor configured to reduce multiple statistical measures received from a plurality of processors to generate normalization parameters;
receiving the normalization parameters from the at least one additional processor; and
reverting the speculative normalization operation to a pre-normalization state when the estimated normalization parameters are outside of an acceptable range of the normalization parameters received from the at least one additional processor.

19. The computer-readable media of claim 18, the steps further comprising:
applying, in a second normalization operation, the normalization parameters to the activations to generate normalized activations; and
providing the normalized activations as a feature vector to a particular processor in the plurality of processors configured to implement a subsequent layer of the neural network model.

20. The computer-readable media of claim 18, wherein the estimated normalization parameters are outside of the acceptable range of the normalization parameters when a difference between the estimated normalization parameters and the normalization parameters is greater than a threshold value.

21. An autonomous vehicle that utilizes a neural network model, comprising:

at least one processor configured to:

process a set of training samples allocated to the at least one processor by a layer of a neural network model to generate activations, analyze the activations to calculate a statistical measure associated with the activations for the at least one sample, generate estimated normalization parameters based on the statistical measure, apply, in a speculative normalization operation, the estimated normalization parameters to at least a portion of the activations to generate normalized activations, and revert the speculative normalization operation to a pre-normalization state when the estimated normalization parameters are outside of an acceptable range of normalization parameters received via a network, wherein at least one processor is in communication with at least one additional processor configured to:

receive multiple statistical measures from a plurality of processors, the multiple statistical measures including the statistical measure calculated by the at least one processor, reduce the multiple statistical measures received from the plurality of processors to generate normalization parameters associated with the layer of the neural network model, and transmit the normalization parameters to each of the processors in the plurality of processors via the network, and wherein the speculative normalization operation is performed in parallel with the at least one additional processor generating the normalization parameters.

22. The autonomous vehicle of claim 21, further comprising a transceiver configured to transmit the statistical measure to the at least one additional processor and receive the normalization parameters from the at least one additional processor via a wireless communications medium.

23. The autonomous vehicle of claim 21, wherein the at least one additional processor and the plurality of processors are included in the autonomous vehicle.

24. The autonomous vehicle of claim 21, wherein the autonomous vehicle is one of an automobile, a truck, a ship, an aircraft, a spacecraft, or an armored vehicle.

25. The autonomous vehicle of claim 21, wherein at least a portion of the set of training samples is generated by a sensor network included in the autonomous vehicle during manual operation of the autonomous vehicle.

* * * * *